United States Patent [19]
Pirklbauer et al.

[11] Patent Number: 4,606,799
[45] Date of Patent: Aug. 19, 1986

[54] METHOD, AND AN ARRANGEMENT, FOR PRODUCING SYNTHESIS GASES

[75] Inventors: Wilfried Pirklbauer, Neuhofen; Ferdinand Jarema, Linz, both of Austria

[73] Assignee: Voest-Alpine Aktiengesellschaft, Linz, Austria

[21] Appl. No.: 715,397

[22] Filed: Mar. 25, 1985

[30] Foreign Application Priority Data

Apr. 2, 1984 [AT] Austria ................. 1110/84

[51] Int. Cl.⁴ .............................................. C07C 3/24
[52] U.S. Cl. ................... 204/170; 204/172; 422/186
[58] Field of Search ............... 204/168, 170, 172, 173; 422/186; 252/373; 219/121 P

[56] References Cited

U.S. PATENT DOCUMENTS

| | | | |
|---|---|---|---|
| 1,056,045 | 3/1913 | Murray | 204/170 |
| 1,282,445 | 10/1918 | McKee | 204/170 |
| 2,000,224 | 5/1935 | Eisenhut | 204/170 |
| 4,010,089 | 3/1977 | Stowell | 204/170 |
| 4,181,504 | 1/1980 | Camacho | 48/197 R |
| 4,472,172 | 9/1984 | Sheer | 204/170 |

FOREIGN PATENT DOCUMENTS

| | | |
|---|---|---|
| 2512178 | 3/1975 | Fed. Rep. of Germany . |
| 3104281 | 2/1981 | Fed. Rep. of Germany . |
| 1332531 | 6/1971 | United Kingdom . |

Primary Examiner—John F. Niebling
Attorney, Agent, or Firm—Brumbaugh, Graves, Donohue & Raymond

[57] ABSTRACT

In a method for the production of synthesis or reduction gases from carbonaceous fuels and oxygen-containing gases endothermally reacting with the fuels, the starting products are reacted in a plasma reaction zone. In order to provide a method by which the production of reduction gases is feasible up to the highest flow rates in an operationally safe manner and by an optimum utilization of the energy supplied, the components to be reacted are commonly conducted through an elongate reaction chamber as a feed fluid. A central plasma jet is formed over the total longitudinal extension of the reaction chamber. The arrangement, i.e., the elongate reaction chamber, includes a plasma electrode (cathode) on one end and a counter electrode (anode) on the other end; supply ducts for the feed fluid and discharge ducts for the synthesis or reduction gases in the region of the plasma electrode end are provided.

9 Claims, 4 Drawing Figures

METHOD, AND AN ARRANGEMENT, FOR PRODUCING SYNTHESIS GASES

BACKGROUND OF THE INVENTION

The invention relates to a method for the production of synthetic gases, in particular reduction gases, from carbonaceous fuels, such as coal, coke, petroleum products, natural gas, coke oven gas, on the one hand, and oxygen-containing gases endothermally reacting with the fuels, such as steam and carbon dioxide, on the other hand, by reacting these starting products in a plasma reaction zone, as well as to an arrangement for carrying out the method.

Large amounts of synthesis or reduction gases of this type are required, for instance, in direct reduction plants for the production of iron sponge from iron oxides.

The supply to direct reduction plants operating with such gases hitherto has been realized by catalytically splitting natural gas in a so-called reformer in the presence of water and/or carbon dioxide. The resulting gas mixture, substantially comprised of carbon monoxide and hydrogen, is suited for the direct reduction of oxidic starting materials to metals. Such a reformer is composed of externally heated pipes filled with a catalyst—for instance, on a cobalt-nickel-base—through which the starting gas mixture is conducted and simultaneously reacted.

However, slight amounts of sulfur contained in the starting gas mixture may lead to a contamination, and thus inactivation, of the catalyst. Moreover, soot depositions on the catalyst mass occur again and again, which result in considerable production disturbances due to an undersupply, or interruptions in the supply, of reduction gas to the direct reduction plant. The pipe material of the reformers must resist very high temperatures of about 1,000° C., and thus only high-temperature resistant alloys can be used as materials, for instance, chromium-nickel-based centrifugally cast parts. Even that material tends to intercrystalline corrosion, and thus to the formation of cracks, under the constant chemical and thermal loads. Therefore, both the catalyst and the pipes must be exchanged from time to time, which involves high costs.

The gasification of coal as well as the conversion of other gases or liquid carbon carriers into reduction gases has not been widely put into practice so far.

In German Offenlegungsschrift No. 3,104,281 a method is disclosed, in which a gas mixture substantially comprised of CO and $H_2$ is formed in a gas generator from a fraction of a reaction gas of a shaft furnace, which gas has been freed from $CO_2$ and $H_2O$, from a solid reductant as well as from an oxidant. The energy supply is effected by means of a plasma burner heating the reaction gas. As a solid reductant, in particular, carbon dust and as an oxidant, in particular, water are laterally blown into the heated gas. The ashes of the solid reductant collect on the bottom of the generator and are drawn off.

It is disadvantageous with this production of reduction gas that solid reductants or fuels are obligatory and the energy given off by the indirect plasma burner provided according to German Offenlegungsschrift No. 3,104,281 cannot be optimally utilized. This is so because the heat is given off from a plasma burner primarily by radiation and the contact zone with the reactants is very short.

In German patent No. 2,512,178 an arrangement for introducing hot reduction gases, produced by means of plasma energy, into the hearth of a blast furnace via tuyeres is described, which arrangement is comprised of at least one cylindrical plasma furnace arranged concentrically to the longitudinal axes of the tuyeres in front of the same. The plasma furnace is open both towards the tuyere and towards the hot-blast supply and, according to the embodiment illustrated, includes three radial indirect plasma burners offset to each other by 120°. The arrangement described most specifically is designed to heat the hot blast of a shaft furnace to particularly high temperatures and is not suited for the production of synthetic gases in the sense of the above mentioned reformers.

In British patent No. 1,332,531 it is proposed to supply a hot reduction gas instead of blast to a shaft furnace, in particular a blast furnace, wherein the reduction gas is to be heated i.a. by plasma burners preferably arranged in the interior of the tuyeres of the shaft furnace. No details are given with respect to the production of the reduction gas from gaseous or liquid hydrocarbons and an oxygen-containing gas, but it is merely stated that these components may be supplied to the arc of a plasma simultaneously and in suitable portions. It has been found that the production of a reduction gas merely on the basis of these data is possible in practice only with an extremely unsatisfactory efficacy—if at all.

SUMMARY OF THE INVENTION

This invention aims at avoiding the described difficulties and disadvantages of known methods for the production of reduction gases and has as its object to provide a method and an arrangement by which the production of reduction gases is feasible up to the highest flow rates in an operationally safe manner and by an optimum utilization of the energy supplied.

In accordance with the method of the invention, this object is achieved in that the components to be reacted are commonly conducted through an elongate reaction chamber as a so-called feed fluid (feed gas) and a central plasma jet (plasma arc) is formed over the total longitudinal extension of the reaction chamber.

A feed fluid (feed gas) is meant to be either a purely gaseous mixture or a mixture of fuels and oxygen-containing gases, which contains solid or liquid carbon carriers suspended therein.

With methane as the main component of natural gas and the simplest hydrocarbon, the high-temperature reaction with carbon dioxide or with water proceeds according to the following reaction equations:

$$CH_4 + CO_2 \rightleftharpoons 2CO + 2H_2 \tag{1}$$

$$CH_4 + H_2O \rightleftharpoons CO + 3H_2 \tag{2}$$

With coal or coke dust, the known temperature-dependent equilibrium reactions take place:

$$C + CO_2 \rightleftharpoons 2CO \tag{3}$$

$$C + H_2O \rightleftharpoons CO + H_2 \tag{4}$$

By an intimate contact with the plasma jet, equilibrium occurs within an extraordinarily short time. Because of the very high temperatures essentially only those gases which correspond to the right-hand side of the equations exist.

With the method according to the invention, a heavy agitation of the feed fluid also takes place during the contact with the elongate plasma jet, which has a likewise favorable effect on the speed and completion of the reactions.

A possible sulfur content in the components of the feed fluid in no way has a negative effect. Sulfur compounds contained in the reduction gas produced may, however, be removed if the sulfur content of the product to be obtained by the influence of the reduction gas must lie below certain limit values.

According to a suitable embodiment of the method, the feed fluid is directed to the plasma-jet-forming plasma gas in counterflow that is, in a direction opposite to the flow of the plasma gas.

In many cases it is also advantageous to supply the feed fluid to the internal zone of the substantially cylindrical plasma jet through a supply duct centrally issuing in an annular electrode. In such case, the feed fluid flows in the same direction as the plasma-jet-forming gas.

It is, for instance, also possible to blow in the fluid from an annular gap or from a nozzle ring in the plasma burner so that it flows in the same direction as the plasma gas and tightly surrounds the plasma jet as like a jacket.

Preferably, a noble gas, oxygen, hydrogen, carbon dioxide or a mixture of two or more of these gases is used as the plasma gas for the formation of the plasma jet.

By appropriate choice of the plasma gas, it is possible to vary the operation parameters of the plasma jet in any desired manner. The individual gases have different electric voltage gradients ($E = U \cdot cm^{-1}$), argon having the lowest and hydrogen having the highest voltage gradient. The length of the plasma jet formed depends on the magnitude of the voltage gradient with a determined overall voltage between electrode and counter electrode, which means that the plasma torch is longer with a gas having a lower voltage gradient under otherwise equal conditions. Thus, when using argon as the plasma gas and a voltage of about 800 V, the plasma torch has a length of up to about 1 m, whereas, when using hydrogen as the plasma gas and the same voltage and current intensity, the jet has a length of only about 10 cm. If the distance between the two electrodes is not variable, a considerably higher overall voltage must be applied when using hydrogen than with the utilization of, for instance, argon, so that the energy input through the plasma jet also is much higher when using hydrogen as the plasma gas.

In particular, if purely gaseous mixtures are available as feed fluids, it has frequently proved particularly suitable to use the feed fluid as such for the plasma gas to form a the plasma jet. With this embodiment, it is also possible to inject as the plasma gas an oxygen-containing gas only, for instance, $CO_2$, and to separately supply the carbonaceous fuel, for instance, methane, to the plasma reaction zone in one of the manners described.

An arrangement according to the invention for carrying out the method, comprises a refractorily lined or cooled reaction vessel, characterized in that the reaction vessel is designed as an elongate reaction chamber having a plasma electrode (cathode) on one end and a counter electrode (anode) on the other end; and that supply ducts for the feed fluid and discharge ducts for the synthetic or reduction gases in the region of the end comprising the plasma electrode are provided.

According to an advantageous design, the plasma electrode is designed as an annular electrode, the supply duct for the feed fluid being disposed at the center of the electrode.

Alternatively, it is also suitable if the feed-fluid supply duct annularly surrounds the plasma electrode.

Preferably, the diameter of the reaction chamber exceeds the diameter of the electrodes only slightly with a counterflow guidance of the feed fluid.

BRIEF DESCRIPTION OF THE DRAWING

The invention will now be explained in more detail with reference to the accompanying drawings, wherein.

DETAILED DESCRIPTION OF EXEMPLARY EMBODIMENTS

Figure 1:
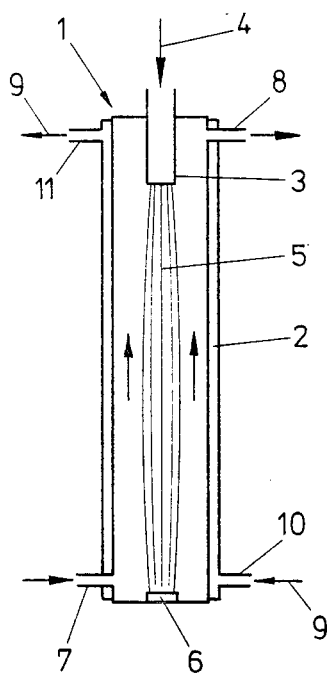
FIGS. 1 to 4 represent various embodiments of the arrangement according to the invention in schematic illustrations.

FIG. 1 illustrates an elongate reaction chamber 1, which is surrounded by a double shell 2 through which a coolant flows. The plasma gas is introduced in the direction of the arrow 4 through the plasma electrode 3 operated as the cathode. The diameter of the reaction chamber is dimensioned such that the plasma jet 5 between the electrode 3 and the counter electrode 6 can just be maintained without touching the internal wall of the reaction chamber 1, i.e., the inner diameter of the chamber only slightly exceeds the diameter of the electrodes and thus of the plasma jet. The feed fluid is supplied through at least one supply duct 7 disposed closely above the bottom of the reaction chamber 1. The feed fluid enters the interior of the reaction chamber 1, where it enters into intensive contact with the plasma jet 5 over the total length thereof, flows in a direction counter to the flow of the jet-forming plasma gas. At the same time the feed fluid is converted into reduction gas in an endothermal reaction, which reduction gas leaves the reaction chamber via at least one discharge duct 8. The coolant 9 flows in through a connector 10 provided in the lower region of the double shell 2 and is drawn off through a duct 11 provided in the upper region of the double shell 2.

Figure 2:
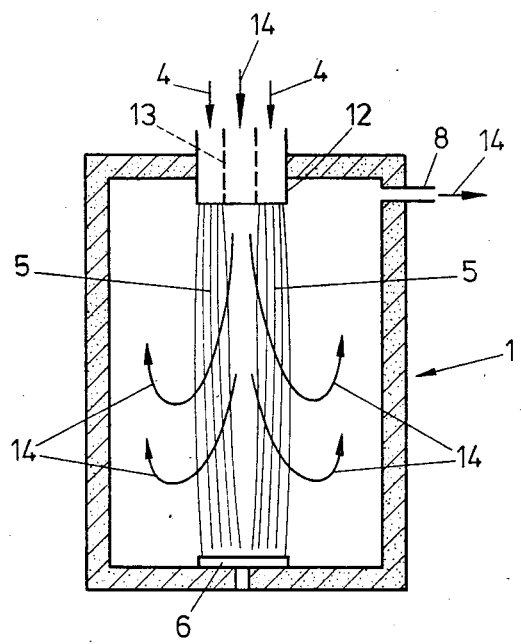

In FIG. 2, a refractorily lined reaction chamber 1 comprising a plasma electrode designed as an annular electrode 12 is illustrated. In the center of this annular electrode 12, is disposed the supply duct 13 for the feed fluid, thus supplying the feed fluid located in the interior of the plasma burner. The plasma gas, which is supplied to the annular plasma electrode 12 also in the interior of the plasma burner, yet outside of the central supply duct 13, is indicated by directional arrows 4. The feed fluid penetrates through the plasma, departing from the center of the annular plasma jet 5. The flow course is indicated by arrows 14. During this penetration procedure, the feed fluid is being reacted, leaving the chamber 1 as a reduction gas through at least one discharge duct 8.

Figure 3:
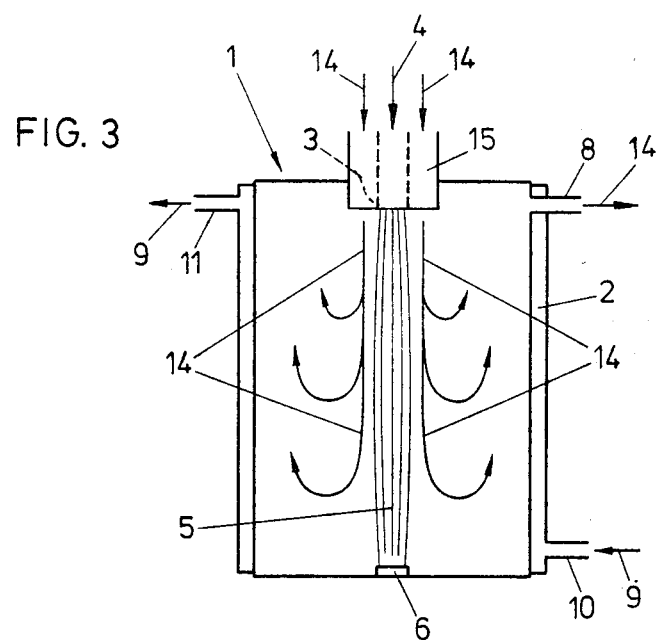

In the embodiment of FIG. 3, another cooled reaction chamber 1 of metal is provided. The supply duct 15 for the feed fluid again has been integrated in the plasma burner in a manner that it surrounds the plasma electrode 3 annularly. The course of the feed fluid is indicated roughly by the partially fanned-out arrows 14. The feed fluid emerges in the immediate vicinity of the plasma electrode 3 and, at first, surrounds the plasma jet 4 closely like a cable jacket before it is deflected—following the chamber form—and guided exteriorly of the chamber as a reduction gas through one or more discharge ducts 8. The radiation heat of the plasma jet 5 is utilized even by the gas mixture flowing back again in the direction to the plasma burner 3 on the way to the discharge ducts 8.

Figure 4:
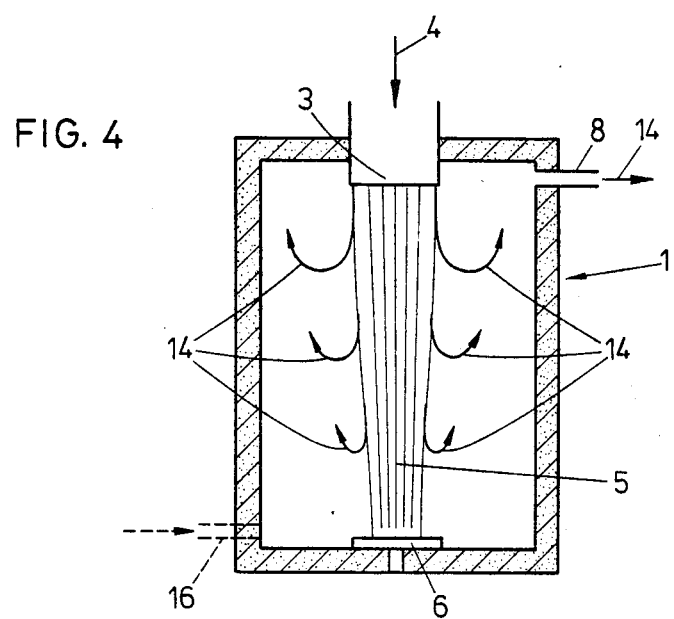

With the embodiment according to FIG. 4, the feed fluid is also used as the plasma gas, indicated by the arrow 4. The reaction chamber 1 again is refractorily lined, yet could, of course, also be made of metal, with a cooling jacket. The diameter of the plasma electrode 3 has been illustrated relatively large in the schematic drawing in order to emphasize that, in this case, it is suitable to design the electrode tip with a larger area and to provide a very wide-lumen supply for the feed fluid serving as the plasma gas. A portion of the feed fluid, which contains fuel components, for instance, optionally can be introduced into the reaction chamber through a supply duct 16 illustrated in broken lines in order to enter into reaction with the already heated components. The arrows 14 again symbolize the main flow course of the synthesis or reduction gases.

What we claim is:

1. A method for producing synthesis gases, in particular reduction gases, from starting products comprised of carbonaceous fuels including coal, coke, petroleum products, natural gas, coke oven gas and the like, and of oxygen-containing gases including water vapor and carbon dioxide capable of endothermally reacting with said fuels comprising the steps of providing a reaction vessel having an interior elongated reaction chamber, supplying a plasma-jet-forming plasma gas to said reaction chamber in a given direction at one end thereof, establishing a plasma jet extending in said given direction along substantially the entire longitudinal length of said reaction chamber to form a plasma reaction zone in said chamber, supplying said starting products as a feed fluid to said reaction chamber and into intensive contact with said plasma jet over a substantial portion of the length thereof to endothermally react said starting products to produce said synthesis gases, and drawing off said synthesis gas from one end of said chamber.

2. A method as set forth in claim 1, wherein said feed fluid is conducted in a direction counter to the direction of said plasma-jet-forming plasma gas.

3. A method as set forth in claim 1 wherein said feed fluid is supplied to said one end of said reaction chamber to flow in the same direction as and be surrounded by said plasma-jet-forming plasma gas, whereby said feed fluid is supplied interiorly of said plasma jet.

4. A method as set forth in claim 1, wherein said plasma-jet-forming plasma gas is selected from the group consisting of noble gas, nitrogen, hydrogen, carbon dioxide and mixtures of at least two of these gases.

5. A method as set forth in claim 1, wherein said feed fluid is used as said plasma-jet-forming plasma gas.

6. An arrangement for producing synthesis gases, in particular reduction gases, from starting products comprised of carbonaceous fuels including coal, coke, petroleum products, natural gas, coke oven gas and the like, and of oxygen-containing gases including water vapor and carbon dioxide capable of endothermally reacting with said fuels, comprising a reaction vessel providing an elongated interior reaction chamber, means including plasma and counter electrodes disposed at respective opposite ends of said elongated chamber for establishing a plasma jet extending along the longitudinal length of said chamber between said electrodes, means for supplying said starting products as a feed fluid to intensively contact said plasma jet over a substantial portion of the length thereof, and discharge means adjacent the plasma electrode end of said chamber for drawing off synthesis gas produced in said chamber.

7. An arrangement as set forth in claim 6, wherein said plasma electrode is an annular electrode and said means for supplying said feed fluid comprises a duct disposed centrally of said plasma electrode.

8. An arrangement as set forth in claim 6 wherein said means for supplying said feed fluid comprises an annular duct surrounding said plasma electrode.

9. An arrangement as set forth in claim 6 wherein the diameter of said reaction chamber only slightly exceeds the diameter of said electrodes and said feed fluid is supplied by said supplying means to flow in a direction counter to the direction of said plasma jet.

* * * * *